United States Patent

[11] 3,619,036

| [72] | Inventor | James G. Baker |
| | | Winchester, Mass. |
| [21] | Appl. No. | 774,141 |
| [22] | Filed | Nov. 7, 1968 |
| [45] | Patented | Nov. 9, 1971 |
| [73] | Assignee | Polaroid Corporation |
| | | Cambridge, Mass. |

[54] COMPACT FOUR ELEMENT PHOTOGRAPHIC OBJECTIVE LENS
25 Claims, 6 Drawing Figs.

| [52] | U.S. Cl. | 350/221, |
| | | 350/255 |
| [51] | Int. Cl. | G02b 9/36 |
| [50] | Field of Search | 350/221, |
| | | 255, 187 |

[56] References Cited
UNITED STATES PATENTS
| 2,338,614 | 1/1944 | Aklin | 350/221 |
| 2,503,789 | 4/1950 | Wood et al. | 350/(187) UX |

FOREIGN PATENTS
| 24,391 | 11/1905 | Great Britain | 350/221 |

Primary Examiner—John K. Corbin
Attorneys—Brown and Mikulka, William D. Roberson, Gerald L. Smith and Frederick H. Brustman ABSTRACT: Compact airspaced four element photographic objectives are shown with an overall length less than ⅛ the focal length. Chromatic and spherical aberrations, coma, astigmatism, field curvature and distortion are corrected. The ratio of the minimum Abbe $\nu$ value of the first and fourth elements to the maximum Abbe $\nu$ value of the second and third elements (i.e., Baker's Ratio) is less than 1.2. The Petzval sum does not exceed 0.225. Focusing is accomplished by a movable first element.

PATENTED NOV 9 1971

| F = 1.000 | | L.O.A. = .0959 F | f/8 |
|---|---|---|---|
| LENS | $n_d$ | $v_d$ | RADII | THICKNESSES |
| I | 1.682 | 48.2 | $R_1$ = +.2263F | $t_1$ = .0189F |
| | | | $R_2$ = ∞ | $S_1$ = .0041F |
| II | 1.501 | 56.4 | $R_3$ = −.6748F | $t_2$ = .0084F |
| | | | $R_4$ = +.3409F | $S_2$ = .0112F |
| III | 1.617 | 31.0 | $R_5$ = −.4715F | $t_3$ = .0084F |
| | | | $R_6$ = +.3485F | $S_3$ = .0292F |
| IV | 1.667 | 48.4 | $R_7$ = +1.330F | $t_4$ = .0157F |
| | | | $R_8$ = −.2732F | $S_4$ = 1.0032F |

FIG. 2

INVENTOR.
JAMES G. BAKER

BY

Brown and Mikulka
and
Fredrick H. Brustman
ATTORNEYS

COMPACT FOUR ELEMENT PHOTOGRAPHIC OBJECTIVE LENS

BACKGROUND OF THE INVENTION

Four element lens systems comprising outer positive elements with inner negative elements have long been known. These systems of early vintage usually consisted of outer positive elements which had the same, or substantially the same, indices of refraction and Abbe Y values, and of inner negative elements which also had the same, or substantially the same, indices of refraction and Abbe Y values. Generally, the positive elements had higher indices of refraction and higher Abbe Y values than the inner negative elements. This simple construction lead to an approximately symmetrical objective for an infinitely long conjugate and for 1:1 conjugates to an exactly symmetrical objective. The lens systems of this general design as known in the prior art are not especially compact; in some instances, the overall length is more than one-third the focal length. The correction for field curvature as represented by the Petzval sum, P, is not optimum, either, in the majority of prior art lenses of this general four-element configuration.

The design of useful photographic objectives requires consideration of the correction of many different aberrations inherent in optical lens systems. Some of the aberrations which must be dealt with, and which the optical designer must seek to correct, include lateral and longitudinal chromatic aberrations, coma, astigmatism, field curvature and distortion. Correction of the chromatic aberrations is particularly important in modern photographic objectives because of the widespread use of color photographic films. In treating these aberrations and in attempting to find solutions within the other desired parameters of a photographic objective, for example size and cost of the final design, the designer must deal with the results of many simultaneous solutions of many nonlinear equations that are closely related mathematically, even if they must be treated in segments. The effect of several of these aberrations on the design of a compact, well-corrected photographic objective are considered below.

The chromatic aberrations of an optical system are of two distinct types, i.e., longitudinal and lateral.

Longitudinal chromatic aberration results from the lens having a different image location along the axis for each wavelength of light, because the index of refraction is different for each wavelength of light. Lateral chromatic aberration is the designation given to the formation of color images of different size because of differences in magnification caused by focal length dependence on wavelength. This defect can remain even in a lens which is corrected for longitudinal chromatism.

The corrections for longitudinal and lateral chromatic aberrations are achieved in two different manners. A classical correction for longitudinal chromatic aberration is the use of closely spaced, typically contacting, pairs of optical elements. These pairs, generally known as achromatic doublets, are constructed from two different glasses, one having a large Abbe Y value used for the stronger or convergent element in the doublet. The weaker or divergent element of the achromatic doublet is typically made from a glass having a lower Abbe Y value. In older art the stronger or convergent element typically had the lower index of the pair of glasses, but in more recent practice a wider choice of indices prevails, according to other requirements. The shapes of the respective elements can be determined through the use of formulas known to those skilled in the art. The result is a pair of lenses which in combination tend to cancel each other's dispersion, but which have a net optical power other than zero. This result is achieved because of the relatively large differences in dispersion between the types of optical glass employed. The achromatic doublet so described, composed of a closely spaced, contacting pair of elements, is also substantially corrected for lateral color without further design control. This comes about because, for very thin lens elements in contact, the principal planes for the several wavelengths will all lie fairly close to each other. The focal lengths for these wavelengths will then be approximately the same. The sizes of the respective images for different wavelengths of light will then be approximately equal in the common image plane produced by the prior correction for longitudinal chromatic aberration, and the lateral chromatic aberration is thereby minimized.

The approximate correction described above for lateral chromatic aberration inherent in a thin achromatic doublet does not hold in the case of thick lens elements nor for lens elements which are not nearly in contact with each other. Such a thick, or airspaced, doublet will then suffer from lateral chromatic aberration even though corrected for longitudinal chromatic aberration. This is so because for thick lenses, and for lenses physically separated from each other, the principal planes for the several wavelengths of light, do not lie close together. Thus, while several wavelengths may have a common image plane whereby longitudinal chromatic aberration is corrected, the focal lengths for the several wavelengths will be different, resulting in a different size of image for the different wavelengths even though the images lie in a common plane. An airspaced doublet cannot therefore be corrected simultaneously for longitudinal and lateral chromatic aberrations unless further compounded.

If longitudinal chromatic aberration is not corrected, then lateral chromatic aberration can be eliminated in a fairly simple manner by the use of two lens elements, even though made from the same type of optical material. This type of correction for lateral chromatic aberration is achieved by the use of an airspace between the two elements which is equal to one-half the sum of the focal lengths of the two elements. This correction for lateral chromatic aberration yields the same magnification for every wavelength of light, but the various images will lie in different image planes. It can be seen, then, that this correction for lateral chromatic aberration introduces strong longitudinal chromatic aberration. The solution, therefore, is unsatisfactory by itself for use in photographic objectives which are required to bring the images of various wavelengths into a common plane in which a photosensitive material can be placed. In the above solution for lateral chromatic aberration, it will be appreciated that to form an optical system of reasonable size the two elements which are to be spaced apart should be of opposite, but not equal power.

In the prior art it has been a common practice to reduce or to eliminate lateral chromatic aberration by combining elements into similar but opposed groupings on either side of a central stop. In this way the prismatic dispersions of the chief rays can be made more or less equal in magnitude but opposite in algebraic sign for the two groupings. The system as a whole will then show little or no final dispersion of the chief rays at the image plane, even though in either grouping separately, a very large dispersion of the chief rays exists. Then also, in the prior art it has been the practice to correct each group separately for longitudinal chromatic aberration, which then remains corrected for the system when the two groupings are combined. The combination of two elements for each grouping on either side of a central stop or plane of symmetry in the prior art then permitted the designer to employ thick lens elements, or large airspaces, or both, to achieve simultaneous corrections for longitudinal and lateral chromatic aberrations and other monochromatic aberrations. Because of this, the overall length of this general class of photographic objectives has been considered to be an inconsequential result of the design for correcting the chromatic aberrations. This assumption has placed an artificial limitation on the compactness which can be achieved in a photographic camera.

In the prior art it has been a common practice to achieve a flattening of the image field by making use of comparatively large airspaces between the positive and negative lens elements where the freedom to correct the chromatic aberrations by choice of glasses and approximate symmetry has been retained. It is known that the nature of the Petzval sum, P, which is the curvature or reciprocal radius of an anastigmatic image surface, requires that the collective negative lens powers of the system be only somewhat smaller in numerical magnitude than the collective positive powers of the system. The net power of the system, however, depends on this similar sum of the individual powers, as modified by the airspaces. It has been assumed that, if the net power of the system is to be acceptably large, the airspaces must be large. In the prior art compromises have been made resulting in both an overall length between front and rear elements amounting to a large fraction of the focal length of the system, and in some residual curvature of field arising from too large a value for the Petzval sum, P, in different measures.

This invention, by contrast, considers the overall barrel length as a variable which can be controlled to achieve an intentionally compact, well-corrected photographic objective lens.

BRIEF SUMMARY OF THE INVENTION

Among the principal objects of this invention are to provide:
a very compact photographic objective;
one which is well corrected for longitudinal and lateral chromatic aberrations;
one having an approximately flat field, represented by a Petzval sum less than 0.225;
one which is well corrected for spherical aberration, coma, astigmatism and distortion;
a lens whose overall length does not exceed one-eighth its focal length; and
a lens which is focused by adjusting the front element, having an approximately constant back focal distance, which remains sufficiently well corrected for all aberrations throughout a range of object distances from three times the focal length to infinity.

These and other objects of the invention are accomplished by a compact four-element lens system of two divergent lenses surrounded by two convergent lenses which exhibits a particular relationship between the Abbe Y values of the outer lenses and the Abbe Y values of the inner elements. The special relationship to be observed in accordance with this invention is that the minimum Abbe Y value of the two outer elements does not exceed 1.2 times the maximum Abbe Y value of the two inner elements. This relationship can be expressed as a ratio, hereinafter referred to as Baker's Ratio, thus:

$$(Y_{1, 4\ min}/Y_{2, 3\ max}) < 1.2$$

By maintaining the value of Baker's Ratio below 1.2 it is possible to construct a compact well-corrected lens with overall length not exceeding one-eighth the focal length and an approximately flat field with a Petzval sum less than 0.225.

DESCRIPTION OF THE DRAWINGS

Additional objects and advantages of the invention are more fully set forth in the accompanying detailed description taken together with the accompanying drawings wherein.

DETAILED DESCRIPTION

Figure 1:
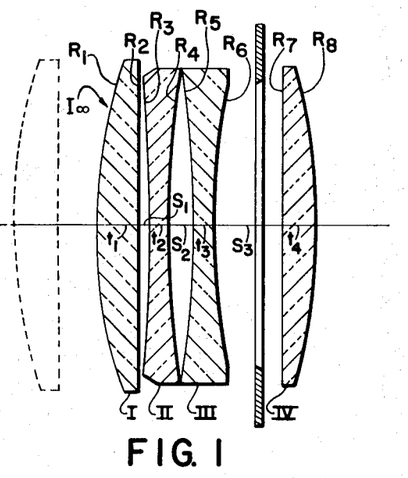
FIG. 1 is a cross-sectional view of a compact, well-corrected photographic objective according to the invention in which focusing is accomplished by adjustment of the front element.

FIG. 1 shows a very compact four-element photographic objective lens. Lens elements I through IV are numbered in order from the long conjugate or front side of the objective lens to the short conjugate or rear of lens. Lens element I is shown in the position for which the compact photographic objective is focused at infinity. The dotted lines represent the position of lens element I when the objective lens is focused on an object approximately three times its focal length away. As seen in the figure, element I and element IV are both convergent lenses while elements II and III are biconcave divergent elements. Airspace $S_1$ is very short when the objective lens system is focused at infinity. Airspace $S_1$ increases in size as the front element I is adjusted to focus the photographic objective lens system on an object nearby. Airspace $S_2$ forms a negative air lens between elements II and III. The size of airspace $S_2$ remains constant. The space $S_3$ between lenses III and IV is the largest of the airspaces. The size of airspace $S_3$ also remains constant. The relatively large size of $S_3$ permits the location of an aperture stop between elements III and IV. It is also possible, in this comparatively large airspace, to utilize a between-the-lens shutter at this location which would be useful in constructing a photographic camera which is to be compact.

Element I is shown as a planoconvex lens. The first surface $R_1$ has a relatively strong curvature. The second surface $R_2$ should have little or no curvature. The radius $R_3$ on element II is noticeably curved but is not the strongest curve in the system. The surfaces $R_4$, $R_5$ and $R_6$ have intermediate curvatures which are stronger than $R_3$ but weaker than $R_1$ and $R_8$. The surface represented by $R_7$ has only a slight curve and appears nearly planar. The surface $R_8$ on element IV is another strong curvature.

The unusual compactness of the photographic objective shown in FIG. 1 permits the construction of a very compact photographic camera when installed therein. The constant back focal distance of the objective due to the use of front element focusing permits a photographic camera design wherein the angular field is substantially the same for all object distances, and simplifies the focusing means since only one element which is part of the lens need be moved and which requires much less movement than the entire lens system would. Specific designs of compact four-element photographic objectives constructed in accordance with the principles of this invention are defined by the illustrative examples A through F set forth below. It should be understood that for any particular application of the invention a preferred region of the spectrum may be used in the design. For consistency herein, index, $n$, Abbe value, Y, and Petzval sum, P, have been chosen or calculated for the Helium $d$-line.

Example A

| F=1.000 Lens | $n_d$ | L.O.A.=0.0950F $Y_d$ | $f/8$ Radii | Thicknesses |
|---|---|---|---|---|
| I | 1.682 | 48.2 | $R_1$= +0.2263F | $t_1$= 0.0189F |
|  |  |  | $R_2$= ∞ | $s_1$= 0.0041F |
| II | 1.501 | 56.4 | $R_3$= −0.6748F | $t_2$=** 0.0084F |
|  |  |  | $R_4$= +0.3409F | $s_2$= 0.0112F |
| III | 1.617 | 31.0 | $R_5$= −0.4715F | $t_3$= 0.0084F |
|  |  |  | $R_6$= +0.3485F | $s_3$= 0.0292F |
| IV | 1.667 | 48.4 | $R_7$= +1.330F | $t_4$= 0.0157F |
|  |  |  | **$R_8$= −0.2732F | $s_4$= 1.0032F |

Baker's Ratio: 0.85
Petzval Sum: 0.179

Figure 2:
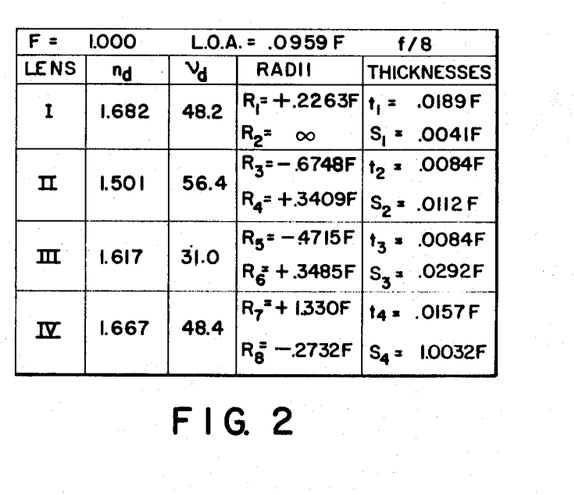
FIG. 2 gives the constructional data, based on unit focal length, for the objective lens of FIG. 1.

It can be seen that the data of example A is the data that is included in FIG. 2 for constructing a species of the compact photographic objective of FIG. 1. It should be noted that the overall length, L.O.A., for this lens example is markedly less than 10 percent of the focal length and the flatness of field as represented by the Petzval sum is less than 0.225. These desirable properties of this invention are associated with a value of Baker's Ratio which is 0.85. It should be noted from the data of example A, and FIG. 2, that the central divergent elements are made from glasses with distinctly different properties. The highest Abbe Y value is in the second lens element.

Example B

| F=1.000 Lens | $n_d$ | L.O.A.=0.1028F $Y_d$ | f/8 Radii | Thicknesses |
|---|---|---|---|---|
| I | 1.641 | 60.1 | $R_1$= +0.2355F | $t_1$= 0.0191F |
| | | | $R_2$= +47.82F | $s_1$= 0.0087F |
| II | 1.523 | 51.5 | $R_3$= −0.8533F | $t_2$= 0.0084F |
| | | | $R_4$= +0.4146F | $s_2$= 0.0120F |
| III | 1.548 | 45.8 | $R_5$= −0.3408F | $t_3$= 0.0084F |
| | | | $R_6$= +0.3172F | $s_3$= 0.0293F |
| IV | 1.641 | 60.1 | $R_7$= +0.9818F | $t_4$= 0.0169F |
| | | | $R_8$= −0.2571F | $s_4$= 0.9998F |

Baker's Ratio: 1.17
Petzval Sum: 0.183

Example B has an overall barrel length slightly in excess of 10 percent of the focal length for infinity focus. The Petzval sum of example B is 0.183. This slightly longer overall barrel length is associated with a larger value of Baker's Ratio than was exhibited for example A. In example B the same glass has been used for the outer convergent elements while the inner divergent elements have glasses of approximately similar indices but noticeably different Abbe Y values. For this example, the space $S_1$ can be seen to be more than twice the value found in example A.

Example C

| F=1.000 Lens | $n_d$ | L.O.A.=0.1009F $Y_d$ | f/8 Radii | Thicknesses |
|---|---|---|---|---|
| I | 1.641 | 60.1 | $R_1$= +0.2428F | $t_1$= 0.0193F |
| | | | $R_2$= −40.93F | $s_1$= 0.0058F |
| II | 1.523 | 51.5 | $R_3$= −0.7475F | $t_2$= 0.0085F |
| | | | $R_4$= +0.4461F | $s_2$= 0.0132F |
| III | 1.548 | 45.8 | $R_5$= −0.3491F | $t_3$= 0.0085F |
| | | | $R_6$= +0.3324F | $s_3$= 0.0286F |
| IV | 1.641 | 60.1 | $R_7$= +1.0221F | $t_4$= 0.0170F |
| | | | $R_8$= −0.2590F | $s_4$= 0.0113F |

Baker's Ratio: 1.17
Petzval Sum: 0.201

Example C also has an overall barrel length slightly greater than 10 percent of the focal length and a Petzval sum less than 0.225. These properties are associated with the larger value of Baker's Ratio to be found in these examples which is 1.17. A comparison of examples B and C demonstrates the effect that the lens surface curvatures and airspacing of the elements can have on the final lens. It can be seen that the glasses employed for example C are the same as those of example B. The overall barrel length and the Petzval sum for the two cases are different. These differences are the result of changes in the radii of all the surfaces and also in the thicknesses and airspacings of the elements. Only a few of the changes are as large as 10 or 15 percent.

Example D

| F=1.000 Lens | $n_d$ | L.O.A.=0.0997F $Y_d$ | f/8 Radii | Thicknesses |
|---|---|---|---|---|
| I | 1.682 | 48.2 | $R_1$= +0.2380F | $t_1$= 0.0188F |
| | | | $R_2$= +13.82F | $s_1$= 0.0067F |
| II | 1.501 | 56.4 | $R_3$= −0.7015F | $t_2$= 0.0084F |
| | | | $R_4$= +0.3783F | $s_2$= 0.0126F |
| III | 1.617 | 31.0 | $R_5$= −0.4338F | $t_3$= 0.0084F |
| | | | $R_6$= +0.3629F | $s_3$= 0.0291F |
| IV | 1.667 | 48.4 | $R_7$= +1.2967F | $t_4$= 0.0157F |
| | | | $R_8$= −0.2682F | $s_4$= 1.0006F |

Baker's Ratio: 0.85
Petzval Sum: 0.185

Example D represents a compact photographic objective made according to this invention possessing an overall barrel length less than 10 percent of the focal length and a Petzval sum of 0.185. These properties are associated with Baker's Ratio of 0.85. It is interesting to note in this case that the surface $R_2$ of element I has the strongest curvature of any of the examples set forth herein. Other changes are introduced for the curvatures of the other elements, but there is no significant change in the thicknesses of airspacings of the elements.

Example E

| F=1.000 Lens | $n_d$ | L.O.A.=0.0974F $Y_d$ | f/8 Radii | Thicknesses |
|---|---|---|---|---|
| I | 1.678 | 55.2 | $R_1$= +0.2236F | $t_1$= 0.0190F |
| | | | $R_2$= ∞ | $s_1$= 0.0055F |
| II | 1.511 | 60.4 | $R_3$= −0.6003F | $t_2$= 0.0080F |
| | | | $R_4$= +0.3431F | $s_2$= 0.0106F |
| III | 1.626 | 35.7 | $R_5$= −0.4748F | $t_3$= 0.0080F |
| | | | $R_6$= +0.3360F | $s_3$= 0.0294F |
| IV | 1.651 | 55.9 | $R_7$= +1.0347F | $t_4$= 0.0169F |
| | | | $R_8$= −0.2621F | $s_4$= 0.0094F |

Baker's Ratio: 0.91
Petzval Sum: 0.187

This example, E, of a compact objective made in accordance with the invention disclosed herein possesses an overall barrel length less than 10 percent of the focal length of the lens and a Petzval sum of 0.187, these values being associated with a Baker's Ratio of 0.91. While the glass indices employed for example E are close to those of the glasses employed in examples A and D, it should be noted that the Abbe Y values differ by approximately 10 percent.

Example F

| F=1.000 Lens | $n_d$ | L.O.A.=0.1011F $Y_d$ | f/8 Radii | Thicknesses |
|---|---|---|---|---|
| I | 1.623 | 56.9 | $R_1$= +0.2252F | $t_1$= 0.0190F |
| | | | $R_2$= ∞ | $s_1$= 0.0064F |
| II | 1.552 | 63.5 | $R_3$= −1.4350F | $t_2$= 0.0084F |
| | | | $R_4$= +0.4143F | $s_2$= 0.0129F |
| III | 1.584 | 37.0 | $R_5$= −0.3401F | $t_3$= 0.0084F |
| | | | $R_6$= +0.3262F | $s_3$= 0.0292F |
| IV | 1.713 | 53.8 | $R_7$= +1.3324F | $t_4$= 0.0168F |
| | | | $R_8$= −0.2786F | $s_4$= 0.0011F |

Baker's Ratio: 0.85
Petzval Sum: 0.190

The overall barrel length of example F is only slightly greater than 10 percent of the focal length of the objective lens. This is associated with a field flatness as measured by the Petzval sum of 0.190. These values are associated with a Baker's Ratio of 0.85. This example is the only one possessing the lower value of Baker's Ratio, but having an overall length greater than 10 percent of the focal length. The Petzval sum is larger than those of the other examples with a value of Baker's Ratio in this range. This serves as another example of the influence that the surface curvatures and lens thicknesses and airspacings can have on the properties of the lens. Example F makes use of a glass with the greatest index of refraction of any of the examples presented herein.

In a successful photographic objective for commercial use an important consideration is the presence of curvature of the photographic objective's image field. The severity of this defect is commonly measured by a term known as the Petzval sum, P. The Petzval sum is dependent solely on the indices of refraction and surface curvatures of the individual elements of the objective. The curvature of field represented by the Petzval sum should not ordinarily, in a practical lens, be made zero; a compromise between Petzval field flatness and higher order aberrations must be accepted, otherwise the complete correction of one will be at an unacceptable cost to the correction of the other. A value of the Petzval sum, P, of 0.225 is maximum for a lens of this genus when used in conjunction with the typically flat commercial photosensitive materials.

In the invention embodied in the objective lens disclosed herein the manipulation of the components with regard to Baker's Ratio has made it possible to achieve a field flatness, as measured by the Petzval sum, superior to that of any other photographic objective known to the art which has a relatively short barrel length.

In calculations for short barrel objective lens systems, it has been discovered that the correction for several aberrations benefit by having the Abbe Y values of the second element rather large compared to that of the third element which is the case in all the examples. The third surface of this compact objective is one of strong refraction, governing a good part of the chromatic spherical aberration and off-axis aberrations of the lower rim rays, It has, therefore, a strong tendency to cause too large an inward refraction of the lower rim rays for the shorter wavelengths, an aberration that can be reduced if the Abbe Y value of the second element is raised to provide less color dispersion. The requirement for an on-axis longitudinal chromatic correction thereafter in the lens system causes the dispersion number of the third element to be lower than it otherwise would be, but still of moderate value because of the desired short lens barrel.

Exhaustive analysis have shown that the index of refraction of the rear element should be substantially higher than that of the front element, as in example F, if the optical corrections are to be maximized and the barrel length is to be minimized. The nature of optical glasses therefore requires in such cases that the dispersion number of this fourth element should be somewhat smaller than that of the first element.

The circumstances of color correction are such that the designer is working in a proper direction by using a lower Abbe Y value for either of the outlying convergent elements and an increased Abbe Y value for either of the inner divergent elements, compared to the simple case where the divergent elements have substantially the same Y value as each other and the convergent elements have substantially the same Y value. Several considerations, outlined below, lead to the desirability of having the greatest value of Abbe Y value in the second element. This desired relationship of dispersive values of the various elements is expressed in the form of Baker's Ratio which has been defined above. Examination of the data tabulated above for the six species shows that the shorter lenses are associated with the lower value of Baker's Ratio and a high Abbe Y value in the second element. Baker's Ratio must not exceed 1.2 for lenses made according to the teachings of this invention.

Figure 3:
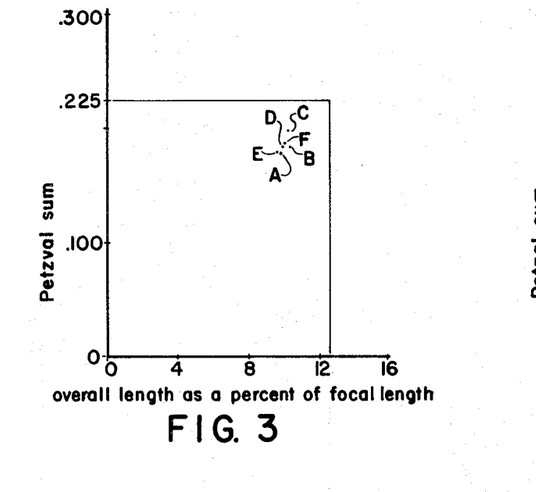
FIG. 3 is a graph showing the region which the examples discussed herein occupy on coordinates representing overall length versus Petzval sum.
Figure 4:
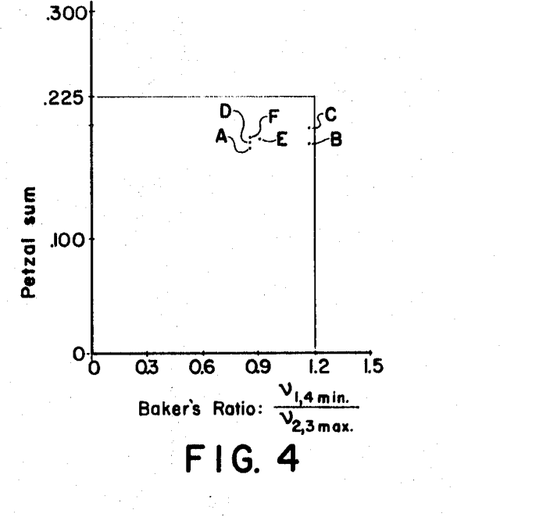
FIG. 4 is a graph showing the region which the examples discussed occupy on coordinates representing Baker's Ratio versus Petzval sum.
Figure 5:
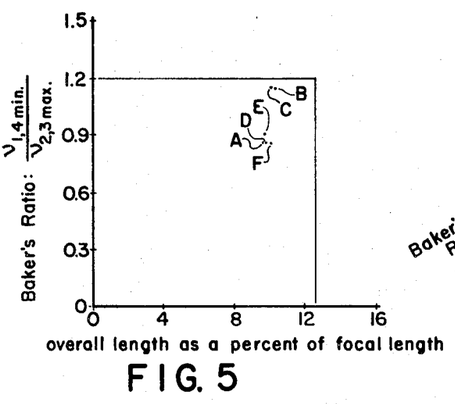
FIG. 5 is a graph showing the region which the examples discussed occupy on coordinates representing overall length versus Baker's Ratio.

The relations of examples A through F in the three important parameters of Baker's Ratio, overall barrel length, and Petzval sum are shown in several of the accompanying figures. The points labeled A through F in FIGS. 3, 4 and 5 represent the examples A through F presented above. FIG. 3 presents the six examples, A through F, on a graph which plots the Petzval sum and the overall barrel length. FIG. 4 is a graph of Petzval sum versus Baker's Ratio. FIG. 5 is a graph showing the six examples with regard for their values of Baker's Ratio and overall barrel length. It can be seen that for these defined properties all six examples cluster within one general region of space near the zero point of the axis, bounded on the outside by a maximum barrel length of one-eighth the focal length, maximum Petzval sum of 0.200, and a maximum Baker's Ratio of 1.2.

Figure 6:
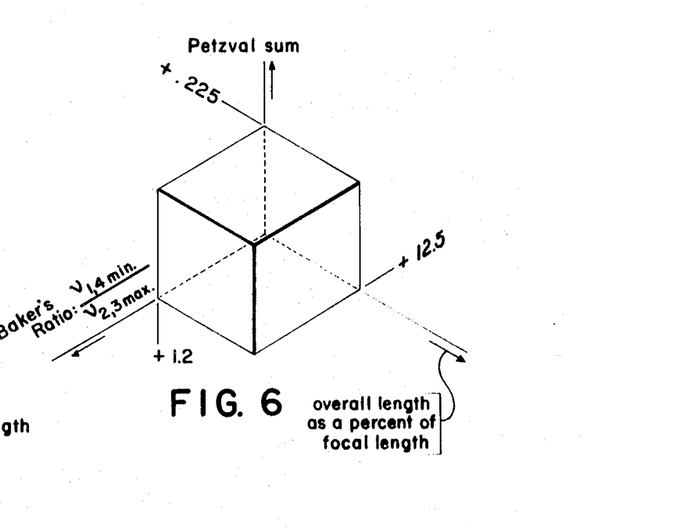
FIG. 6 is a three-dimensional representation of the volume occupied by lenses according to this invention in an optical space defined by the coordinate axes of FIGS. 3, 4 and 5.

FIG. 6 depicts an optical space of merit defined in terms of the coordinates of FIGS. 3, 4 and 5. Within the boundaries of this space may be found all the examples of lens systems made in accordance with this invention. The dimensions of this optical space of merit are Petzval sum, overall barrel length as a percent of focal length, and Baker's Ratio. Well-corrected corrected photographic objectives within this space of merit have the common attributes of relatively flat field represented by low values of Petzval sum and short overall barrel lengths less than one-eighth the focal length; compactness and flatness of field coupled with adequate corrections for lateral and longitudinal chromatism, spherical aberration, coma, astigmatism and distortion are achieved by maintaining Baker's Ratio at a value which is less than 1.2.

DISCUSSION OF THE RANGE OF VARIATION OF INDIVIDUAL PARAMETERS

In the examples discussed above the first airspace $S_1$ reaches its minimum value when the lens is focused for infinity. In practice, there is necessarily a minimum value somewhat greater than zero to allow for mounting clearances and for the cases where the adjacent surfaces forming the first airspace are concave to one another. Zero may reasonably be adopted as the minimum design value of the first airspace where all cases are considered. The maximum value of $S_1$, and therefore the minimum "close up" distance, is limited to the distance which causes the chromatic aberrations to be excessive.

The second airspace $S_2$, is limited also by physical considerations. Its minimum value occurs when the surfaces $R_4$ and $R_5$ touch one another at the specified clear aperture. For all systems these surfaces are concave to one another, forming a negative air-lens. In terms of unit focal length, F, one might adopt a minimum value of 0.005F although if a lens designer set out deliberately to have a still smaller value, other principles of the invention would not be materially affected. The systems of the examples above, however, have this second airspace value approximately in the range from 0.011F to 0.014F. An upper bound is set on this second airspace by the requirements of a restricted overall barrel length. An upper bound of 0.030F on this second airspace allows for the possible use of an iris diaphragm or shutter or both in this second airspace and for some improvement where necessary in performance, without increasing the overall barrel length unduly.

The third airspace, $S_3$, is limited by performance requirements and the possibility of using therein a shutter or iris diaphragm or both. Accordingly, a lower bound can be set at 0.020F for simplified systems. The upper bound is set by the need to have a compact barrel length and by the importance of maintaining some symmetry of construction for a mean focal setting in order that the correction for distortion, coma and lateral color be reasonably well met. A reasonable upper bound is 0.050F when it is understood that a prime purpose of this invention is compactness. Any larger value would require a reworking of all other limits to achieve a reasonable performance. To do so would not result in a compact system.

The first radius, $R_1$ will always be positive, that is, a convex surface. If the radius is too long, the front element will either be too biconvex or too weak in optical power. If weak in optical power, front element focusing would require excessive movement which in turn would increase the variations of lateral chromatism, distortion and astigmatism. If this first radius is too short, and the lens too strong in optical power, serious oblique aberrations will be introduced, and these will be exacerbated by the front element focusing. If the first radius is too short, but the lens power appropriate, the front element will be more of a positive meniscus than acceptable front element focusing over an extended range, according to this invention, will allow. Preferably this first radius should lie in a range from 0.19F to 0.28F.

Where front element focusing is employed, studies indicate that the second surface, $R_2$, will always be nearly flat or indeed strictly flat by design. That is to say, optimum front element focusing over an extended range appears to require that the second surface have a long radius, whether positive or negative. If this second surface is either too convex or too concave, front element focusing will introduce an excessive variation in the astigmatic coefficient over an extended focusing range. Either the focusing range must be decreased or else the concavity or convexity of this second surface must be restricted. Studies have shown that this second radius should preferably be of an absolute value numerically greater than 2.00F, whether concave or convex.

The third radius, $R_3$, appears to be limited only in the extent of its concavity and occasional convexity according different designs. If it is too concave, excessive inward and uncorrectible coma is caused. If too convex, the element will have insufficient optical power, throwing too much burden on the third element with consequent damage to the oblique ray performance. It is possible to accentuate some aspects, particularly by lowering the index of refraction of this second element. The nature of optical glasses are such that this results in a higher Abbe Y value for the second element. The low index would generally be accompanied by a more strongly concave third surface of the system. Accordingly, a reasonable range of variation of this third radius is from minus 0.50F (concave) through infinity to plus 1.00F (convex). The numerical value of this third radius should preferably exceed 0.50F whether concave or convex.

The fourth radius, $R_4$, of the system is limited in both directions also. It is important for the performance that the central airspace be a negative air-lens. Coma correction requires that the adjacent surfaces both be concave. If $R_4$ is too shallow, that is concave but of large radius, the second element is either optically weak, upsetting other corrections again, or else it is bent toward the long conjugate too much, resulting in too concave a third surface of the system beyond the stipulated range given above. If $R_4$ is too concave, its periphery will either strike the fifth surface below the required clear aperture or will enlarge the central airspace unduly. Accordingly, a reasonable range would be numerically between 0.28F and 0.60F.

The fifth surface, $R_5$, if too concave may strike the fourth or alternately require too large a central airspace. More importantly, if too concave, it may cause excessive inward coma and overcorrected spherical aberration. If too long in radius, that is too weakly concave, the optical power of the third element will either be too low, resulting in inability to correct the system for longitudinal and lateral chromatism, or else $R_6$ will be too concave, leading to excessive outward coma and possible overcorrected spherical aberration. Accordingly, a reasonable range for $R_5$ numerically is between 0.24F and 0.60F.

The sixth radius, $R_6$, of the system will always be strongly concave, inasmuch as a substantial portion of the Petzval correction for flatness of field occurs here. However, there are indeed limits on the concavity. Too short a radius, numerically, will cause overcorrected spherical aberration and oblique spherical aberration as well as an excessive outward coma. Too long a radius numerically will cause unacceptable curvature of field and undercorrection generally for longitudinal chromatic aberration. A reasonable range for $R_6$ would be numerically between 0.22F and 0.50F.

In objective lenses according to this invention, $R_7$ is usually weakly convex. The convexity depends on the index and power of the rear or fourth element. If this surface were to be flat, the rear element would either be too weak optically or would have too strongly curved an eighth radius. If this seventh surface were to be too strongly convex, an excessively undercorrected astigmatism results. Accordingly, a reasonable range for this seventh surface is a radius numerically between 0.60F and 5.00F.

The last surface of the system, the eighth radius, is always strongly convex, but if too short, strongly undercorrected spherical aberration results. If $R_8$ is too long, either the element will be too weak, optically, to attain adequate flatness of field and general symmetry of the system, of else the seventh radius will become too convex with the consequences depicted above. According to this invention then, this radius should lie in the range numerically from 0.20F to 0.35F.

As a general rule, in compact optical systems of this type, the convergent outer elements should have high indices and the divergent inner elements should have low indices. The very high index glass types may not have sufficient transparency in the violet portion of the spectrum or may be subject to atmospheric attach or may be commercially uneconomical. High indices for the positive elements allow shallower curvatures, i.e., larger radii, with improved corrections for aberrations. The high index glasses are particularly useful in reducing the Petzval sum without the use of excessively short radii in the system. Low indices for the negative elements are, in general, favorable but are a mixed blessing. Low index glasses for the negative elements assist the reduction of the Petzval sum too but result in sharper curvatures, i.e., shorter radii. The gains outweigh the losses, however. If the positive elements are made with very high indices, and the negative elements with intermediate indices, then all advantages can be had more or less at once. There is no real limit on this arrangement numerically, but in practice available glass types must be used with consideration for the practical matters outlined above.

A teaching of this invention is that the index of refraction of the first convergent element should be greater than 1.60 for compact systems at $f/8$ intended to have focusing front elements. If the lens speed is reduced to $f/11$, then this index limit can be reduced to 1.55. There is no upper limit except that of availability of glass types.

The index of refraction of the second element should generally be low, but it depends on the choice of index for the first element. According to this invention, a lower bound of $n = 1.44$ and an upper bound $n = 1.65$ for this element is required. The latter depends on any extremely high index that may be used for the first element. The lower bound of $n = 1.44$ is set by the current availability of such a practicable glass type. The absolute optimum performance does not seem to require the very lowest index because the radii become too short and begin to fall outside the limits previously discussed.

The index for the third, divergent, element should also, in general, be low. In systems of the type considered here, much of the color correction is effected by this third element. The nature of optical glasses, as currently understood, is such that if an adequate dispersion is used for this third element, the index is accordingly higher. Except for some peculiar glasses, this boundary is clearly shown on the usual glass chart of $n$ vs. Y for glasses. Some plastics do lie below the glass curve but not by any very great amount. Within the limitations on index for the first and second elements discussed above, the index for the third, divergent, element should be from $n=1.53$ to $n=1.70$. The former value works well only in systems having outlying convergent elements of high Y.

The index of the last or fourth, convergent, element according to this invention should, in general, be nearly equal to or higher than that for the first element, as shown in the examples. The range is therefore greater than for the first element and becomes from $n=1.50$ to $n=1.90$.

The ranges of Abbe Y value have also been determined for this invention. Clearly, if all glasses had infinite Y, there would be no need for color correction and there would be no need for even calculating at other than a mean wavelength. In practicable systems, however, the design must begin either at the upper bound of existing glass types for the positive elements or at the lower bound of Abbe Y value for the existing glass types for the negative elements. One could extend the range of Abbe Y values by special design, e.g., the use of a cemented doublet to construct a component with a synthetic Abbe Y value, and relaxation of one or more conditions. For both the first and last elements the Abbe Y value can lie between 70 and 45. In general, those systems having front and rear elements with Y near 70 will have markedly less color aberration residuals than those near the lower bound. The choice of index, n, also influences the choice of Y. Preferred systems have Y in the neighborhood of 60 for the first and last elements, using the medium high indices now available for such Abbe Y values.

The range of Y for the second element is quite broad according to this invention, and indeed extends from 85 to 40. If Y is high for the second, divergent, element, Y for the third, divergent, element will generally be low to make up for the loss of dispersion. Accordingly, the range of Y for the third element extends from 55 to 28, the latter, small figure, going well with the high index and medium Y choices, where they occur, for the first and last elements.

In light of the foregoing discussion, it should be understood that the specific examples discussed above in explicit detail are to be taken as illustrative of the broad principles of this invention and not necessarily as limiting on its scope.

What is claimed is:

1. A compact four-element photographic objective lens corrected for lateral and longitudinal chromatic aberrations, spherical aberration, coma, astigmatism, field curvature, and distortion comprising four axially aligned airspaced elements arranged in the following order from the long conjugate side to the short conjugate side of the objective lens: a first convergent element, a second divergent element, a third divergent element and a fourth convergent element, and wherein said lens has an overall length less than one-eighth of its focal length and the indices, Abbe Y values and radii for the respective surfaces are within the limits set forth below:

| Lens element | Index of refraction | Abbe value | Surface radii |
|---|---|---|---|
| I | $n_d \geq 1.55$ | $45 \leq \nu_d \leq 70$ | $0.19 F \leq R_1 \leq 0.28F$ |
| | | | $\bar{R}_2 \geq 2.00F$ |
| II | $n_d \leq 1.65$ | $40 \leq \nu_d \leq 85$ | $\bar{R}_3 \geq 0.50F$ |
| | | | $0.28 F \leq R_4 \leq 0.60F$ |
| III | $1.53 \leq n_d \leq 1.70$ | $28 \leq \nu_d \leq 55$ | $-0.24 F \leq R_5 \leq -0.60F$ |
| | | | $0.22 F \leq R_6 \leq 0.50F$ |
| IV | $1.50 \leq n_d \leq 1.90$ | $45 \leq \nu_d \leq 70$ | $0.60 F \leq R_7 \leq 5.00F$ |
| | | | $-0.20 F \leq R_8 \leq -0.35F$ | wherein the lens elements are identified by Roman numerals in order from front to rear; $n_d$ is the index of refraction for the d line of the spectrum; $Y_d$ is the Abbe Y value; $R_1, R_2 \ldots$ represent the radii of curvature of the refractive surfaces from front to rear; and a bar over the radius, R, represents the absolute value without regard to sign of the associated numbers.

2. The compact four-element photographic objective lens of claim 1 wherein the ratio of the minimum Abbe Y value for the first and fourth elements to the maximum Abbe Y value for the second and third elements does not exceed 1.2, the Petzval sum does not exceed 0.225.

3. A compact, four-element photographic objective lens having the design parameters for a unit focal length, F, represented in the following table:

| F=1.000 Lens | $n_d$ | $Y_d$ | L.O.A.=0.0959F Radii | Thicknesses |
|---|---|---|---|---|
| I | 1.682 | 48.2 | $R_1= +0.2263F$ | $t_1= 0.0189F$ |
| | | | $R_2= \infty$ | $s_1= 0.0041F$ |
| II | 1.501 | 56.4 | $R_3= -0.6748F$ | $t_2= 0.0084F$ |
| | | | $R_4= +0.3409F$ | $s_2= 0.0112F$ |
| III | 1.617 | 31.0 | $R_5= -0.4715F$ | $t_3= 0.0084F$ |
| | | | $R_6= +0.3485F$ | $s_3= 0.0292F$ |
| IV | 1.667 | 48.4 | $R_7= +1.330F$ | $t_4= 0.0157F$ |
| | | | $R_8= -0.2732F$ | $s_4= 1.0032F$ | wherein Roman numerals identify lens elements in order from front to rear; $n_d$ is the refractive index at 587.6 nanometers; $Y_d$ is Abbe's ratio; $R_1, R_2, \ldots$ represent radii of successive refractive surfaces from front to rear; $t$ and $s$ represent thicknesses of lens elements and airspaces respectively.

4. A compact, four-element, photographic objective lens having the design parameters for a unit focal length, F, represented in the following table:

| F=1.000 Lens | $n_d$ | $Y_d$ | L.O.A.=0.1028F Radii | Thicknesses |
|---|---|---|---|---|
| I | 1.641 | 60.1 | $R_1= +0.2355F$ | $t_1= 0.0191F$ |
| | | | $R_2= +47.82F$ | $s_1= 0.0087F$ |
| II | 1.523 | 51.5 | $R_3= -0.8533F$ | $t_2= 0.0084F$ |
| | | | $R_4= +0.4146F$ | $s_2= 0.0120F$ |
| III | 1.548 | 45.8 | $R_5= -0.3408F$ | $t_3= 0.0084F$ |
| | | | $R_6= +0.3172F$ | $s_3= 0.0293F$ |
| IV | 1.641 | 60.1 | $R_7= +0.9808F$ | $t_4= 0.0169F$ |
| | | | $R_8= -0.2571F$ | $s_4= 0.9998F$ | wherein Roman numerals identify lens elements in order from front to rear; $n_d$ is the refractive index at 587.6 nanometers; $Y_d$ is Abbe's ratio; $R_1, R_2, \ldots$ represent radii of successive refractive surfaces from front to rear; $t$ and $s$ represent thicknesses of lens elements and airspaces respectively.

5. A compact, four-element, photographic objective lens having the design parameters for a unit focal length, F, represented in the following table:

| F=1.000 Lens | $n_d$ | $Y_d$ | L.O.A.=0.1009F Radii | Thicknesses |
|---|---|---|---|---|
| I | 1.641 | 60.1 | $R_1= +0.2428F$ | $t_1= 0.0193F$ |
| | | | $R_2= -40.93F$ | $s_1= 0.0058F$ |
| II | 1.523 | 51.5 | $R_3= -0.7475F$ | $t_2= 0.0085F$ |
| | | | $R_4= +0.4461F$ | $s_2= 0.0132F$ |
| III | 1.548 | 45.8 | $R_5= -0.3491F$ | $t_3= 0.0085F$ |
| | | | $R_6= +0.3324F$ | $s_3= 0.0286F$ |
| IV | 1.641 | 60.1 | $R_7= +1.0221F$ | $t_4= 0.0170F$ |
| | | | $R_8= -0.2590F$ | $s_4= 1.0113 F$ | wherein Roman numerals identify lens elements in order from front to rear; $n_d$ is the refractive index at 587.6 nanometers; $Y_d$ Abbe's ratio; $R_1, R_2, \ldots$ represent radii of successive refractive surfaces from front to rear; $t$ and $s$ represent thicknesses of lens elements and airspaces respectively.

6. A compact, four-element, photographic objective lens having the design parameters for a unit focal length, F, represented in the following table:

| F=1.000 Lens | $n_d$ | $Y_d$ | L.O.A.=0.0997F Radii | Thicknesses |
|---|---|---|---|---|
| I | 1.682 | 48.2 | $R_1= +0.2380F$ | $t_1= 0.0188F$ |
| | | | $R_2= +13.82F$ | $s_1= 0.0067F$ |
| II | 1.501 | 56.4 | $R_3= -0.7015F$ | |
| | $t_2= 0.0084F$ | | | |
| | | | $R_4= +0.3783F$ | $s_2= 0.0126F$ |
| III | 1.617 | 31.0 | $R_5= -0.4338F$ | $t_3= 0.0084F$ |
| | | | $R_6= +0.3629F$ | $s_3= 0.0291F$ |
| IV | 1.667 | 48.4 | $R_7= +1.2967F$ | $t_4= 0.0157F$ |
| | | | $R_8= -0.2682F$ | $s_4= 1.0006F$ | wherein Roman numerals identify lens elements in order from front to rear; $n_d$ is the refractive index at 587.6 nanometers; $Y_d$ is Abbe's ratio; $R_1, R_2, \ldots$ represent radii of successive refractive surfaces from front to rear; $t$ and $s$ represent thicknesses of lens elements and airspaces respectively.

7. A compact, four-element, photographic objective lens having the design parameters for a unit focal length, F, represented in the following table:

| F=1.000 Lens | $n_d$ | $Y_d$ | Radii | f/8 | Thicknesses |
|---|---|---|---|---|---|
| I | 1.678 | 55.2 | $R_1=$ +0.2236F | | $t_1=$ 0.0190F |
| | | | $R_2=$ ∞ | | $s_1=$ 0.0055F |
| II | 1.511 | 60.4 | $R_3=$ −0.6003F | | $t_2=$ 0.0080F |
| | | | $R_4=$ +0.3431F | | $s_2=$ 0.0106F |
| III | 1.626 | 35.7 | $R_5=$ −0.4748F | | $t_3=$ 0.0080F |
| | | | $R_6=$ +0.3360F | | $s_3=$ 0.0294F |
| IV | 1.651 | 55.9 | $R_7=$ +1.0347F | | $t_4=$ 0.0169F |
| | | | $R_8=$ −0.2621F | | $s_4=$ 1.0094F |

L.O.A.=0.0974F wherein Roman numerals identify lens elements in order from front to rear; $n_d$ is the refractive index at 587.6 nanometers; $Y_d$ is Abbe's ratio; $R_1$, $R_2$, ... represent radii of successive refractive surfaces from front to rear; $t$ and $s$ represent thicknesses of lens elements and airspaces respectively.

8. A compact, four-element, photographic objective lens having the design parameters for a unit focal length, F, represented in the following table:

| F=1.000 Lens | $n_d$ | $Y_d$ | Radii | f/8 | Thicknesses |
|---|---|---|---|---|---|
| I | 1.623 | 56.9 | $R_1=$ +0.2252F | | $t_1=$ 0.0190F |
| | | | $R_2=$ ∞ | | $s_1=$ 0.0064F |
| II | 1.552 | 63.5 | $R_3=$ +1.4350F | | $t_2=$ 0.0084F |
| | | | $R_4=$ +0.4143F | | $s_2=$ 0.0129F |
| III | 1.584 | 37.0 | $R_5=$ −0.3401F | | $t_3=$ 0.0084F |
| | | | $R_6=$ +0.3262F | | $s_3=$ 0.0292F |
| IV | 1.713 | 53.8 | $R_7=$ +1.3324F | | $t_4=$ 0.0168F |
| | | | $R_8=$ −0.2786F | | $s_4=$ 1.0011F |

L.O.A.=0.1011F wherein Roman numerals identify lens elements in order from front to rear; $n_d$ is the refractive index at 587.6 nanometers; $Y_d$ is Abbe's ratio; $R_1$, $R_2$, ... represent radii of successive refractive surfaces from front to rear; $t$ and $s$ represent thicknesses of lens elements and airspaces respectively.

9. A compact, four-element photographic objective lens comprising four axially aligned airspaced elements arranged in the following order from the long conjugate side to the short conjugate side of said objective lens: a convergent first element having a convex surface toward said long conjugate and a planar or approximately planar surface toward said short conjugate; a divergent second element having a concave surface toward said short conjugate; a biconcave divergent third element; and a convergent fourth element having a weakly convex surface toward said long conjugate and a convex surface toward said short conjugate; wherein said objective lens has an overall length less than one-eighth of its nominal focal length, the ratio of minimum Abbe Y value of the convergent elements to the maximum Abbe Y value of the divergent elements does not exceed 1.2, and the Petzval sum of said objective lens does not exceed 0.225.

10. The compact photographic objective lens of claim 9 wherein said divergent second element is biconcave.

11. The compact photographic objective lens of claim 9 wherein said convergent first element is movable for focusing purposes.

12. The compact photographic objective lens of claim 11 wherein the power of said convergent first element is at least two and one-half times the power of said objective lens.

13. The compact photographic objective lens of claim 9 wherein the refractive indices of said convergent elements are greater than those of said divergent elements.

14. The compact photographic objective lens of claim 9 wherein the Abbe Y values of said convergent elements is similar.

15. The compact photographic objective lens of claim 9 wherein said divergent third element has greater negative power than said divergent second element.

16. The compact photographic objective lens of claim 9 wherein said convergent fourth element has greater positive power than said convergent first element.

17. The compact photographic objective lens of claim 9 wherein said focal length does not exceed the distance from the first surface of said objective lens to its focal plane.

18. A compact, four-element photographic objective lens as in claim 9 wherein the second surface of said first element has a radius of curvature of a numerical value greater than twice the focal length of said photographic objective lens.

19. A compact, four-element photographic objective lens as in claim 9 wherein the index of refraction of the fourth element is substantially greater than the index of refraction of the first element.

20. A compact, four-element photographic objective lens as in claim 9 having the following indices and Abbe Y values:

| Lens element | Index of refraction | Abbe $\nu$ value |
|---|---|---|
| I | $n_d \geq 1.55$ | $45 \leq \nu_d \leq 70$ |
| II | $n_d \leq 1.65$ | $40 \leq \nu_d \leq 85$ |
| III | $1.53 \leq n_d \leq 1.70$ | $28 \leq \nu_d \leq 55$ |
| IV | $1.60 \leq n_d \leq 1.90$ | $45 \leq \nu_d \leq 70$ |

Where Roman numerals identify the lens elements in order from front to rear; $n_d$ is the index of refraction for the d line of the spectrum; and $Y_d$ is the Abbe Y value.

21. A compact four-element photographic objective lens comprising four axially aligned airspaced elements arranged in the following order from the long conjugate side to the short conjugate side of said objective lens: a convergent first element having a convex surface toward said long conjugate and a planar or approximately planar surface toward said short conjugate; a divergent second element having a concave surface toward said short conjugate; a biconcave divergent third element; and a convergent fourth element having a weakly convex surface toward said long conjugate and a convex surface toward said short conjugate; wherein said objective lens has an overall length less than one-eighth of its nominal focal length, said convergent first element having a power at least 2½ times the power of said objective lens and being movable for focusing purposes, and the ratio of the minimum Abbe Y value of the convergent elements to the maximum Abbe Y value of the divergent elements does not exceed 1.2, and the Petzval sum of said objective lens does not exceed 0.225.

22. The compact photographic objective lens of claim 20 wherein the surface of said convergent first element toward said short conjugate is plano.

23. The compact photographic objective lens of claim 20 wherein the refractive index of said convergent element is at least 1.55.

24. The compact photographic objective lens of claim 20 wherein the Abbe Y value of said convergent first element is at least 45.

25. A compact four-element photographic objective lens corrected for lateral and longitudinal chromatic aberrations, spherical aberration, coma, astigmatism, field curvature, and distortion comprising four axially aligned airspaced elements arranged in the following order from the long conjugate side to the short conjugate side of the objective lens: a convergent first element which moves axially to focus said objective lens, a divergent second element, a divergent third element and a convergent fourth element, wherein the overall length of said objective lens does not exceed one-eighth of the focal length of said objective lens, the ratio of the minimum Abbe Y value for the first and fourth elements to the maximum Abbe Y value for the second and third elements does not exceed 1.2, the Petzval sum does not exceed 0.225 and the refractive indices, Abbe Y values and surface radii do not exceed the boundaries set forth below

| Lens element | Index of refraction | Abbe ν value |
|---|---|---|
| I | $n_d \geq 1.55$ | $45 \leq \nu_d \leq 70$ |
| II | $n_d \leq 1.65$ | $40 \leq \nu_d \leq 85$ |
| III | $1.53 \leq n_d \leq 1.70$ | $28 \leq \nu_d \leq 55$ |
| IV | $1.50 \leq n_d \leq 1.90$ | $45 \leq \nu_d \leq 70$ | wherein the lens elements are identified by Roman numerals in order from front to rear; $n_d$ is the index of refraction for the $d$ line of the spectrum; $Y_d$ is the Abbe Y value; $R_1$, $R_2$, ... represent the radii of curvature of the refractive surfaces from front to rear; and a bar over the radius, $\overline{R}$, represents the absolute value without regard to sign of the associated numbers.

* * * * *